United States Patent [19]

Wilhelmer

[11] Patent Number: 5,209,006
[45] Date of Patent: May 11, 1993

[54] FISHING LURE RETRIEVER

[76] Inventor: Albert Wilhelmer, 634 Herstone Ave., Winnipeg, Canada, R3R 1C9

[21] Appl. No.: 773,427

[22] Filed: Oct. 9, 1991

[51] Int. Cl.⁵ .............................................. A01K 97/00
[52] U.S. Cl. .................................................. 43/17.2
[58] Field of Search ................... 43/1, 17.2; 294/66.1

[56] References Cited

U.S. PATENT DOCUMENTS

| | | | |
|---|---|---|---|
| 2,586,170 | 2/1952 | Lawrene | 43/17.2 |
| 2,807,905 | 10/1957 | Ford | 43/17.2 |
| 2,807,906 | 10/1957 | Mun | 43/17.2 |
| 2,809,460 | 10/1957 | Taylor | 43/17.2 |
| 3,144,728 | 8/1964 | Stevens | 43/17.2 |
| 3,156,064 | 11/1964 | Czirr | 43/17.2 |
| 4,408,411 | 10/1983 | Skarnells | 43/17.2 |
| 4,536,984 | 8/1985 | Kowal | 43/17.2 |

*Primary Examiner*—Richard K. Seidel
*Attorney, Agent, or Firm*—Adrian D. Battison; Stanley G. Ade; Murray E. Thrift

[57] ABSTRACT

A lure retriever includes a bobbin section having a cylindrical bobbin or reel on which a string is wound with a hollow interior into which the lure retriever body is inserted for storage. The lure retriever body itself includes a cast metal cylindrical core with spring wire arms extending out from one end of the core. The spring wire arms are bent so as to extend along the core and inclined outwardly from the sides of the core at an angle of the order of 45°. The spring arms act to retain the body in its storage position within the bobbin. One of the arms extends to a cross bar and loop portion which can be inserted through a loop member at the upper end of the body to form a complete loop for wrapping around a fishing line on which the lure and hook is entrapped. When so positioned the body can slide along the fishing line to the entrapped lure with the weight of the body and the arms acting to release the entrapped lure for reeling in by pulling the string attached to the lure retriever body.

6 Claims, 3 Drawing Sheets

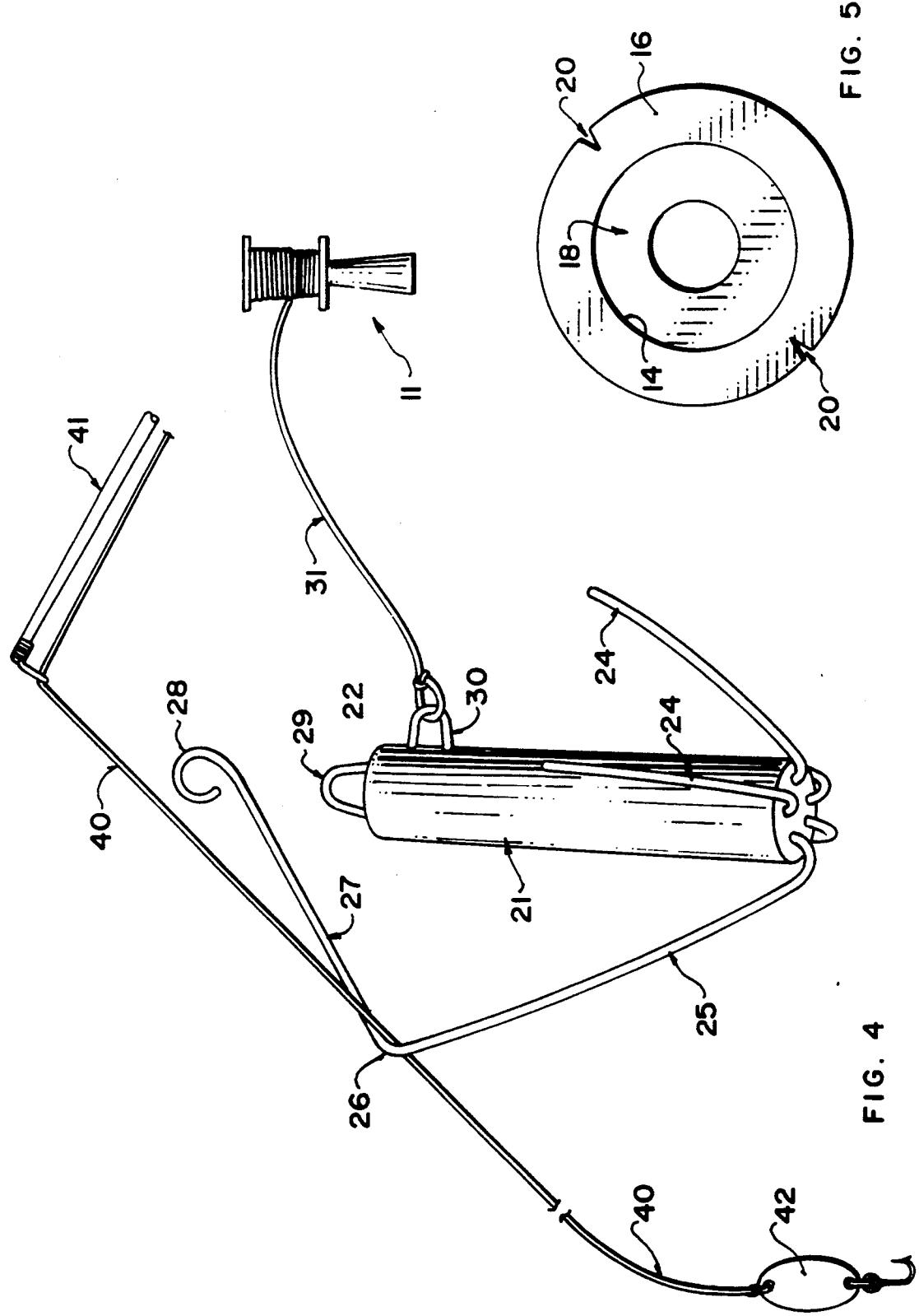

FISHING LURE RETRIEVER

BACKGROUND OF THE INVENTION

This invention relates to a fishing lure retriever of the type which comprises a body which has means thereon for engaging around a fishing line so that the body can slide along the fishing line from the rod toward a trapped lure, means on the body for engaging the trapped lure and a retrieval line attached to the body by which the user can pull the retriever body and the released lure back to the fisherman.

The loss of trapped lures is very frustrating for the average fisherman and can lead to significant expense and can seriously detract from the pleasure of the fishing experience.

Many devices have therefore been proposed for releasing trapped lures so that fisherman can retrieve the device, retrieve the lure and then continue fishing with the same lure and hook without the necessity for modifications to his equipment.

In most cases devices of this type include an elongate line or string which is held by the fisherman. A body includes means by which it can be attached to the fishing line at the end of the rod and can then slide by gravity along the line to the trapped lure. The body then engages the lure with the various shaped elements to release the lure and allow it to be pulled back.

Many of these devices achieve some success in operation but have achieved little success commercially because the design is generally unsatisfactory, difficult to store and in some cases difficult to attach to the line.

Various examples are shown in the following patents: U.S. Pat. No. 2,807,906 (Mun); U.S. Pat. No. 4,223,465 (Nichols); U.S. Pat. No. 3,769,734 (Winkler); U.S. Pat. No. 2,807,905 (Ford); U.S. Pat. No. 3,987,573 (Clayton); U.S. Pat. No. 3,176,425 (Mudd); U.S. Pat. No. 3,601,920 (MASON): U.S. Pat. No. 4,766,689 (Stinar,); U.S. Pat. No. 3,512,292 (Splawinsky); U.S. Pat. No. 2,809,460 (Taylor); Canadian Patent 726,362 (Czirr); Canadian patent 555,146 (Ford); and Canadian Patent 1,178,808 (Chabot).

One of the above examples that is U.S. Pat. No. 2,807,906 of Mun is relatively simple to manufacture including a simple cylindrical body generally formed from cast heavy metal and a plurality of wires which project out of the body. However this device is somewhat unsatisfactory in that it is difficult to attach to the line and may in some cases have difficulty in sliding along the line in view of the relatively close engagement between the line and the body. In addition the device is very difficult to store since it is relatively long and must also include the retrieval string. The user therefore has great difficulty in removing the device from its storage position and operating the device and then returning the device to the storage position without the line becoming heavily entangled with other equipment in the tackle box.

SUMMARY OF THE INVENTION

It is one object of the present invention, therefore, to provide an improved fishing lure retriever.

According to the invention therefore there is provided a fishing lure retriever comprising a lure retriever member having an elongate body, attachment means on the body adjacent one end thereof for attachment to a retrieval line by which the body can be pulled back to the user, a plurality of retrieval arms projecting outwardly from the body for engaging a lure to be retrieved, and a spring wire loop member for engaging around a fishing line for transmission along the line to the lure, the wire loop member comprising a wire loop arm having one end of the arm connected to one end of the body and a hook at the opposed end of the body, an opposed end of the arm being inserted through the hook to form the arm and the body into a closed loop which can be opened by removal of the opposed end of the arm from the hook to wrap the loop around the fishing line and can be engaged by passing the opposed end of the arms through the hook to trap the fishing line within the closed loop while allowing the body to slide along the fishing line.

According to a second aspect of the invention, therefore, there is provided a fishing lure retriever comprising a lure retriever member having an elongate body, attachment means on the body adjacent one end thereof for attachment to a retrieval line by which the body can be pulled back to the user, a plurality of retrieval arms projecting outwardly from the body for engaging a lure to be retrieved, and means on the body for engaging around the fishing line to allow the body to slide along the fishing line, said arms each comprising one of a plurality of spring wire elements extending from an arm end of the body opposed to an end of the body to which the attachment means is arranged, the spring wire elements extending in a direction generally inclined outwardly from and longitudinally of the body from said arm end toward said attachment means, the wire elements being arranged in angularly spaced relation around a longitudinal axis of the body.

According to a third aspect of the invention, therefore, there is provided a fishing lure retriever comprising a lure retriever member having an elongate body, attachment means on the body adjacent one end thereof for attachment to a retrieval line by which the body can be pulled back to the user, a plurality of retrieval arms projecting outwardly from the body for engaging a lure to be retrieved, means on the body for engaging around the fishing line to allow the body to slide along the fishing line, and a bobbin upon which the retrieval line is wound for storage, the bobbin comprising a handle portion and a cylindrical storage portion on an outer surface of which the line is wound, the cylindrical storage portion having a hollow interior within which the retriever member is stored.

The product can be manufactured of durable corrosion free material including particularly plastic, the cast lead body and stainless steel spring wire. The spring wire can be cast with a hook at the end of the wire so that it wont twist or pull out of the cast lead body. Spring wire is used so that it will distort or bend in use. The product can be manufactured in a manner such that it is very compact and thus will store in a small tackle box without the necessity for separate transportation. The storage of the lure retriever body within the hole in the spool provides a very effective storage system. The spool can include a line catch so the string cannot unwind from the spool and become entangled with other equipment in the tackle box.

The device can work with any type of fishing lure and can operate either from a boat or from the shore provided the fishing line is sufficiently steep to allow the body to slide along the line to the lure. The simple attachment of the body to the line allows a very simple sliding action with little friction or resistance so that the body can slide down to the lure even in cases where the line is relatively shallow.

The latching system can be of a type which allows the retriever to lock onto the line so that it cannot come off in use and also allows the lure retriever to slip right over the snagged lure so that the lure can be grasped by the arms on the body and retrieved. The relatively large loop at the latching system allowing the retriever to slide over line weights and other obstructions to the lure.

In the drawings like characters of reference indicate corresponding parts in the different figures.

BRIEF DESCRIPTION

FIG. 4 is an isometric view of the lure body in an initial position as it is being attached to a fishing line.

FIG. 5 is an end elevational view of the bobbin with the lure body removed.

In the drawings like characters of reference indicate corresponding parts in the different figures.

DETAILED DESCRIPTION

Figure 1:
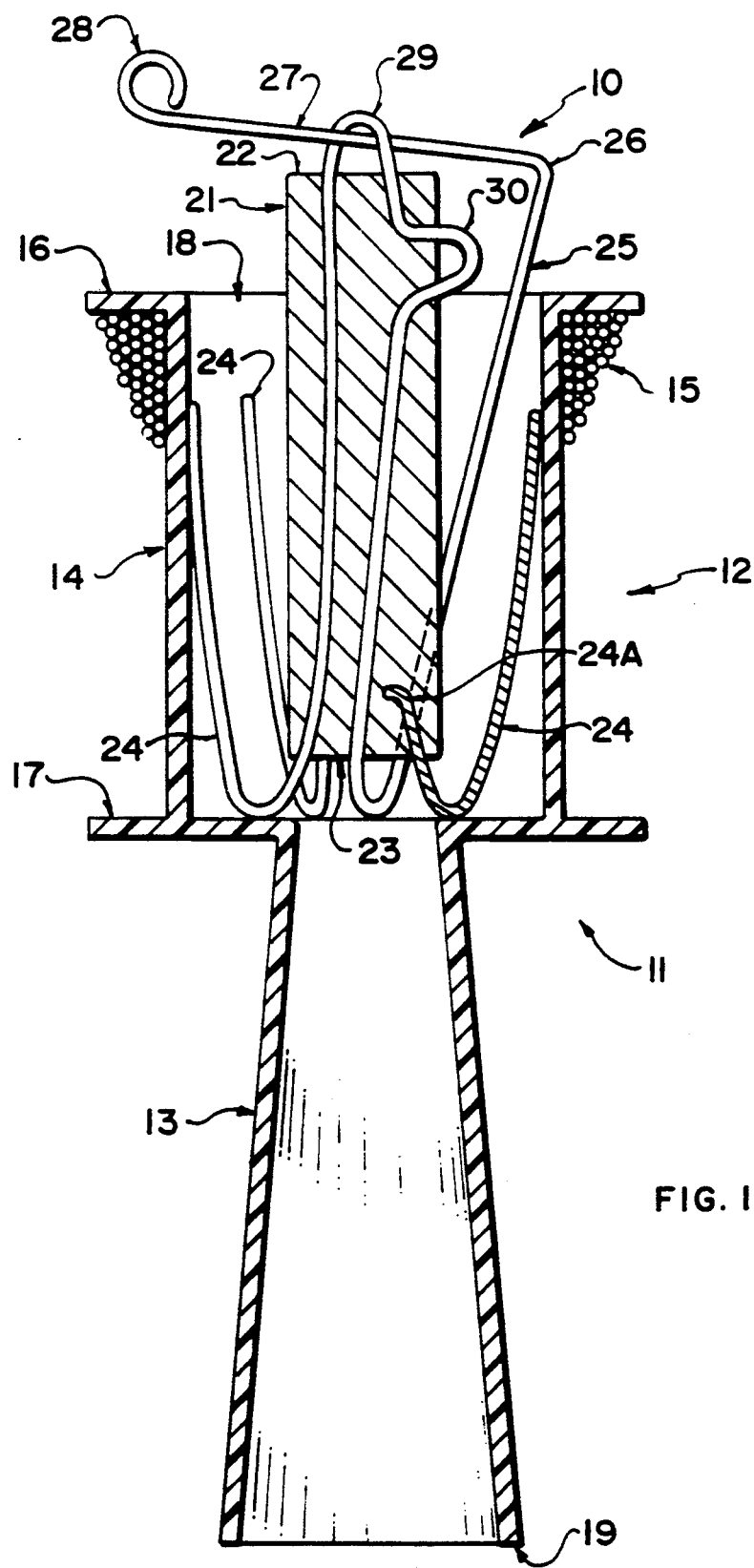
FIG. 1 is a longitudinal cross sectional view through a lure retriever including the lure body, a handle and bobbin arrangement within which the lure body is stored according to the present invention.

The lure body of the lure retriever is generally indicated at 10 and is mounted for storage as shown in FIG. 1 in a bobbin assembly 11 including a cylindrical storage reel area 12 and a handle 13.

The bobbin is molded in plastics material from a single piece and includes a cylindrical wall 14 on which a length of string or other suitable line 15 is stored by wrapping around the cylindrical wall 14. Ends of the cylindrical wall are defined by a pair of flanges 16 and 17 each arranged in an axial plane of the cylindrical wall 14. The flange 16 is annular in shape and projects outwardly from the wall 14 at right angles thereto thus defining an opening 18 in the end of the bobbin into which the lure retriever body 10 can be inserted in the storage position. The flange 17 is shaped similar to the flange 16 but also extends radially inwardly from the cylindrical wall 14 to a position at the base of the handle 13 at which the flange 17 joins integrally with the handle 13. The handles 13 is frusto conical in shape and gradually widens outwardly from its base at the flange 17 to an open end 19. Thus the bobbin section 11 is formed of a lightweight plastics material which provides substantially minimum material for the strength requirements and yet provides an open area for receiving the lure retriever body as shown in FIG. 1. The flanges 16 and 17 both include v-shaped cut outs 20 which act as a trap for the string to prevent it unwinding from a storage position 15.

Figure 2:
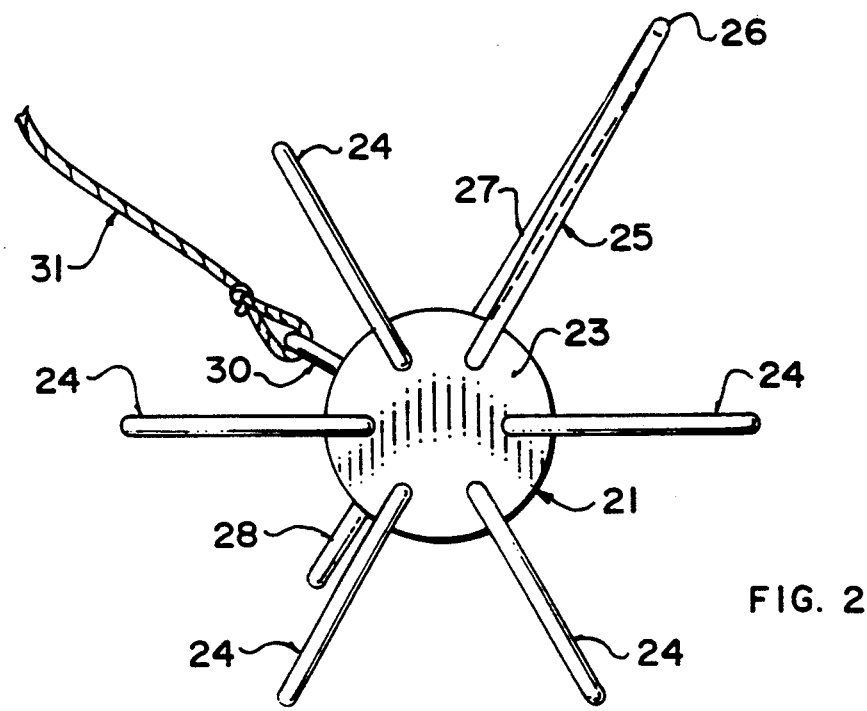
FIG. 2 is a first end elevational view of the lure body of FIG. 1 removed from its storage position.
Figure 3:
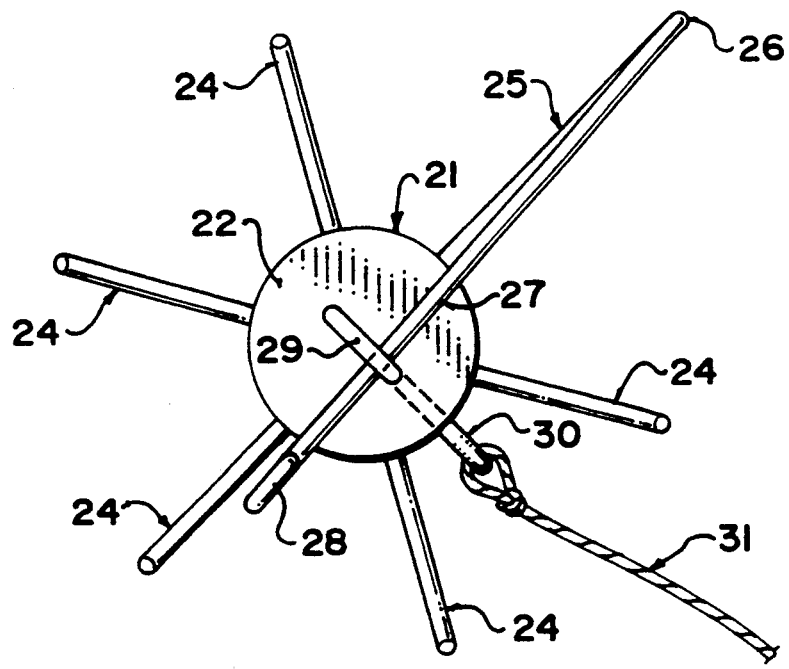
FIG. 3 is a second end elevational view of the lure body of FIG. 2.

The lure retriever body comprises a cast cylindrical block 21 of a heavy metal such as lead. The cylindrical block or body 21 has ends 22 and 23 which are circular in plan view as best shown in FIGS. 2 and 3. Within the body 21 is embedded a plurality of spring wires which project outwardly from the end 23 to form spring wire arms 24. Each of the arms 24 projects outwardly from the end 23 in a substantially axial direction and is then curved gradually outwardly to an apex just beyond the plane of the surface 23. At that point the arm is bent sharply so as to extend upwardly and outwardly at an angle to the axis of the body. Thus each arm extends from the end 23 partly along the body toward the end 22 and at the same time it is inclined outwardly from the body at an angle of the order of 45°. The length of the arm is such that it reaches approximately midway along the length of the body. In the embodiment shown there are six such arms although of course the number may be increased or decreased in accordance with practical requirements.

Five of the arms terminate at an end, stated above, which is approximately midway along the length of the body. A sixth of the arms indicated at 25 is however extended so as to go beyond the end of the other arms to an elbow 26 causing the arm to form a cross portion 27 extending across the end 22 of the body. At the free end of the cross portion 27 is provided a loop 28.

Projecting from the end 22 is a U-shaped loop member 29 which has two legs embedded in the body 21 defining a closed loop projecting outwardly from the end 22. The loop 28 can thus be passed through the loop member 29 to close the arm 25 relative to the body 21.

A second loop member 30 projects outwardly from one side of the body at a position adjacent the end 22 and is attached to a string 31 wound upon the bobbin section.

As shown in FIG. 1, the spring wire is bent within the body so that a single spring wire extends from one of the arms 24 through the interior of the body to the end 22 to form the loop member 29 and then outwardly through the side of the body to form a loop member 30 then returning to the end 23 to form the arm 25. This single piece of spring wire is thus firmly embedded within the body and enables a flexing action of the arms without the danger of the arms becoming loosened from the structure of the body. The other four arms include tail pieces 24A one of which is shown in FIG. 1 which extend into the end 23 of the body to a short distance that include a loop on the end to embed the arm within the body. Alternatively the wire pieces may all be separate with each having a tail to ensure its position in the body.

In operation the lure retriever body is mounted within the receptacle of the end of the bobbin simply by insertion of the body into the hollow cylindrical receptacle portion with the end 23 presented forwardly and the arms compressing against the inside surface. The frictional engagement of the arms with the inside surface holds the lure retriever body in place during the storage condition. The string from the loop member 30 is wound around the bobbin and then trapped in place in one of the v-shaped notches 20.

When it is required to utilize the lure retriever, the cross portion 27 of the arm 25 at the end of the body are grasped and pulled thus releasing the body from the storage receptacle. When removed, a length of the string is unwound so that the bobbin can be held in fixed position while the lure retriever body is deployed.

For the deployment the cross member 27 is pulled from its position within the loop member 29 to take up the position shown in FIG. 4. In this position the elbow 26 is wrapped around a fishing line 40 extending from a fishing rod 41 to a trapped lure and hook arrangement 42.

When the arm 25 is wrapped around the fishing line 40, the hook 28 is passed through the loop member 29 to close the loop defined by the arm 25 and the body so that the fishing line is fully trapped within that loop.

The hook 28 prevents the arm and particularly cross member 27 from coming out of the loop member 29 under the sometimes vigorous action necessary to free the lure and hook 42.

With the lure member thus attached to the fishing line, the string 31 is further unwound and the lure body allowed to slide down the fishing line to the trapped lure. In view of the large area available between the body 21, the arm 25 and the cross member 27, the body can slide along the fishing line easily without danger of becoming entrapped or restricted. The position of the loop member 30 to which the string is attached also allows the device to freely slide and allows it to be pulled rearwardly when it reaches the lure.

In some cases simply the weight of the body reaching the lure and hook 42 will cause release of the hook from its entrapment. In other cases the arms 24 grasp the lure or hook and cause their removal from the entrappment.

When the trapment is released, the string 31 can be rewound and the lure retriever body thus reeled in to recover the lure and hook 42.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fishing lure retriever comprising a lure retriever member having an elongate body, defining a first end and a second end of the body and a longitudinal axis of the body attachment means on the body adjacent the first end thereof for attachment to a retrieval line by which the body can be pulled back to the user, a plurality of wire retrieval arms projecting outwardly from the body for engaging a lure to be retrieved, the wire retrieval arms each being arranged in a respective one of a plurality of axial planes of the body with the axial planes being spaced angularly around the axis of the body, each retrieval arm being connected to the body at the second end thereof and being bent so as to turn back along the body toward the first end surrounding the body and so as to extend in a direction outwardly inclined from the axis of the body, and a spring wire loop member for engaging around a fishing line for transmission along the line to the lure, the wire loop comprising one of said wire retrieval arms connected to the second end of the body, a hook at the first end of the body, and an outer portion of said one wire retrieval arm which is inserted through the hook to form said one retrieval arm and the body into a closed loop.

2. The retriever according to claim 1 wherein the wire retrieval arms extends to a position approximately midway along the length of the body.

3. The retriever according to claim 1 wherein the hook is arranged directly at said first end of the body and wherein the attachment means is arranged on a side surface of the body adjacent to said first end.

4. The retriever according to claim 1 wherein the body comprises a cylindrical heavy metal body.

5. The retriever according to claim 1 including a bobbin upon which the retrieval line is wound for storage, the bobbin comprising a hollow cylindrical storage portion having a longitudinal axis, an inner cylindrical surface and an outer cylindrical surface on the outer cylindrical surface of which the line is wound around the axis, a first and a second axially spaced end flange member confining the line to lie in the outer cylindrical surface and a handle portion connected to the first end flange member and extending therefrom axially of and away from the outer cylindrical surface, the cylindrical storage portion defining said inner cylindrical surface inside the outer cylindrical surface and an open end at the second end flange member within, which the retriever member is stored, the body being arranged in the storage position such that the longitudinal axis of the body lies longitudinal of the longitudinal axis of the cylindrical storage portion and with the retrieval arms engaging the inner cylindrical surface of the cylindrical storage portion to retain the lure retriever member in position therein.

6. A fishing lure retriever comprising a lure retriever member having an elongate body defining a longitudinal axis thereof, attachment means on the body adjacent one end thereof for attachment to a retrieval line by which the body can be pulled back to the user, a plurality of wire retrieval arms projecting outwardly from the body for engaging a lure to be retrieved, the wire retrieval arms each being arranged in a respective one of a plurality of axial planes of the elongate body angularly spaced around the axis of the elongate body so as to lie partly along side the elongate body, means on the body for engaging around the fishing line to allow the body to slide along the fishing line, and a bobbin upon which the retrieval line is wound for storage, the bobbin comprising a hollow cylindrical storage portion having a longitudinal axis, an inner cylindrical surface and an outer cylindrical surface on the outer cylindrical surface of which the line is wound around the axis, a first and a second axially spaced end flange members confining the line to lie on the outer cylindrical surface and a handle portion connected to the first end flange member and extending therefrom axially of and away from the cylindrical surface, the cylindrical storage portion defining said inner cylindrical surface inside the outer cylindrical surface and an open end at the second end flange member within which the retriever member is stored, the body being arranged in the storage position such that the longitudinal axis of the body lines longitudinal of the longitudinal axis of the cylindrical storage portion and with the retrieval arms engaging the inner cylindrical surface of the cylindrical storage portion to retain the lure retriever member in position therein.

* * * * *